US008634350B2

(12) United States Patent
Kang et al.

(10) Patent No.: US 8,634,350 B2
(45) Date of Patent: Jan. 21, 2014

(54) METHOD AND APPARATUS FOR TRANSMITTING AND RECEIVING PAGING MESSAGE USING BAND INFORMATION IN WIRELESS COMMUNICATION SYSTEM

(75) Inventors: Hyun-Jeong Kang, Seoul (KR); Jung-Shin Park, Seoul (KR); Ji-Cheol Lee, Suwon-si (KR); Nae-Hyun Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 237 days.

(21) Appl. No.: 13/152,561

(22) Filed: Jun. 3, 2011

(65) Prior Publication Data
US 2011/0299469 A1     Dec. 8, 2011

(30) Foreign Application Priority Data

Jun. 4, 2010    (KR) .................. 10-2010-0052927
Jun. 10, 2010   (KR) .................. 10-2010-0054698

(51) Int. Cl.
*H04Q 7/00*      (2006.01)
*H04Q 7/24*      (2006.01)

(52) U.S. Cl.
USPC ............................................. 370/328; 370/338

(58) Field of Classification Search
USPC ......... 370/311, 326, 328–330, 336, 338, 341, 370/343, 345, 436
See application file for complete search history.

(56) References Cited

U.S. PATENT DOCUMENTS

| | | | | |
|---|---|---|---|---|
| 6,563,806 | B1* | 5/2003 | Yano et al. ..................... | 370/330 |
| 7,636,337 | B2* | 12/2009 | Parantainen et al. ......... | 370/336 |
| 8,054,792 | B2* | 11/2011 | Higuchi et al. ............... | 370/329 |
| 2003/0088695 | A1* | 5/2003 | Kwak et al. .................... | 709/238 |
| 2004/0114554 | A1 | 6/2004 | Okajima et al. | |
| 2006/0274712 | A1* | 12/2006 | Malladi et al. ................ | 370/345 |
| 2007/0055778 | A1* | 3/2007 | Park et al. ..................... | 709/226 |
| 2009/0219861 | A1* | 9/2009 | Higuchi et al. ............... | 370/328 |
| 2010/0322158 | A1* | 12/2010 | Lee et al. ...................... | 370/329 |

FOREIGN PATENT DOCUMENTS

KR     10-2009-0100478 A    9/2009
KR     10-2010-0023780 A    3/2010

* cited by examiner

*Primary Examiner* — Hong Cho
(74) *Attorney, Agent, or Firm* — Jefferson IP Law, LLP

(57) ABSTRACT

A method and an apparatus for transmitting and receiving a paging message in a wireless communication system are provided. A Base Station (BS) transmits, to a Mobile Station (MS) in an idle mode, a Paging Group IDentification Information (PGID_Info) message including paging group information for a paging group to which the BS belongs, and frequency band-specific paging carrier information for indicating at least one of paging carriers included in each of a plurality of frequency bands operated by the BS. The BS determines a paging carrier for transmitting the paging message among paging carriers included in a frequency band supported by the MS, and transmits the paging message to the MS using the determined paging carrier. By doing so, reception of the paging message in the frequency band supported by the MS is guaranteed, thereby preventing the unnecessary location update procedure.

24 Claims, 8 Drawing Sheets

METHOD AND APPARATUS FOR TRANSMITTING AND RECEIVING PAGING MESSAGE USING BAND INFORMATION IN WIRELESS COMMUNICATION SYSTEM

PRIORITY

This application claims the benefit under 35 U.S.C. §119(a) of a Korean patent application filed in the Korean Intellectual Property Office on Jun. 4, 2010 and assigned Serial No. 10-2010-0052927, and a Korean patent application filed in the Korean Intellectual Property Office on Jun. 10, 2010 and assigned Serial No. 10-2010-0054698, the entire disclosure of each of which is hereby incorporated by reference.

BACKGROUND OF THE INVENTION

1. Field of the Invention

The present invention relates to a wireless communication system. More particularly, the present invention relates to a method and an apparatus for transmitting and receiving paging messages in a wireless communication system using a frequency overlay scheme (hereinafter referred to as a 'frequency overlay communication system').

2. Description of the Related Art

With the development of communication systems, there are various types of services provided, giving rise to the need for research and development on broadband communication systems capable of providing these various types of services over the broadband. Frequency resources in the broadband communication systems are limited. The broadband communication systems are difficult to be designed, because their available frequency bands are limited and their backward compatibility with the legacy communication systems should also be considered.

Broadband communication systems of the related art have been designed on the assumption that they are allocated different frequency bands to provide various types of broadband services. Due to the development of communication technologies, an increase in number of frequency bands for broadband services is required, increasing license fees for frequency bands used and thus causing the latency of various schemes proposed to actually provide broadband services.

Accordingly, there is a need for schemes of seamlessly providing broadband services while overcoming the limitation on frequency bands, or while preventing the increase in license fees for the frequency bands. As one of these schemes, a broadband communication system overlaid with the legacy communication system in a specific frequency band, for example, a Code Division Multiple Access (CDMA) 2000 3x communication system and an overlay Orthogonal Frequency Division Multiple Access (OFDMA) communication system have been considered. In this case, there is a need for a new definition of transmission/reception of paging messages exchanged between a Mobile Station (MS) and a Base Station (BS) in a broadband communication system overlaid in a specific frequency band.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for transmitting and receiving paging messages in a wireless communication system.

Another aspect of the present invention is to provide a method and an apparatus for transmitting a paging message according to the band supported by a Mobile Station (MS).

Another aspect of the present invention is to provide a method and an apparatus for determining a paging carrier based on band information for a band supported by an MS.

In accordance with an aspect of the present invention, a method for transmitting a paging message by a Base Station (BS) in a wireless communication system is provided. The method includes transmitting, to an MS in an idle mode, a Paging Group IDentification Information (PGID_Info) message including paging group information for a paging group to which the BS belongs, and frequency band-specific paging carrier information for indicating at least one of paging carriers included in each of a plurality of frequency bands operated by the BS, determining a paging carrier for transmitting the paging message among paging carriers included in a frequency band supported by the MS, and transmitting the paging message to the MS using the determined paging carrier.

In accordance with another aspect of the present invention, a method for receiving a paging message by an MS in a wireless communication system is provided. The method includes receiving in an idle mode, from a BS, a PGID_Info message including paging group information for a paging group to which the BS belongs, and frequency band-specific paging carrier information for indicating at least one of paging carriers included in each of a plurality of frequency bands operated by the BS, determining a paging carrier for receiving the paging message among paging carriers included in a frequency band supported by the MS, and receiving the paging message from the BS using the determined paging carrier.

In accordance with further another aspect of the present invention, a BS for transmitting a paging message in a wireless communication system is provided. The BS includes a controller for generating a PGID_Info message including paging group information for a paging group to which the BS belongs, and frequency band-specific paging carrier information for indicating at least one of paging carriers included in each of a plurality of frequency bands operated by the BS, and for determining a paging carrier for transmitting the paging message among paging carriers included in the frequency band supported by the MS, and a transceiver for transmitting the PGID_Info message to the MS in an idle mode, and for transmitting the paging message using the determined paging carrier.

In accordance with yet another aspect of the present invention, an MS for receiving a paging message in a wireless communication system is provided. The MS includes a transceiver for receiving a PGID_Info message and the paging message from a BS, and a controller for acquiring, from the PGID_Info message received in an idle mode, paging group information for a paging group to which the BS belongs, and frequency band-specific paging carrier information for indicating at least one of paging carriers included in each of a plurality of frequency bands operated by the BS, for determining a paging carrier for receiving the paging message among paging carriers included in a frequency band supported by the MS, and for controlling the transceiver to monitor the determined paging carrier.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
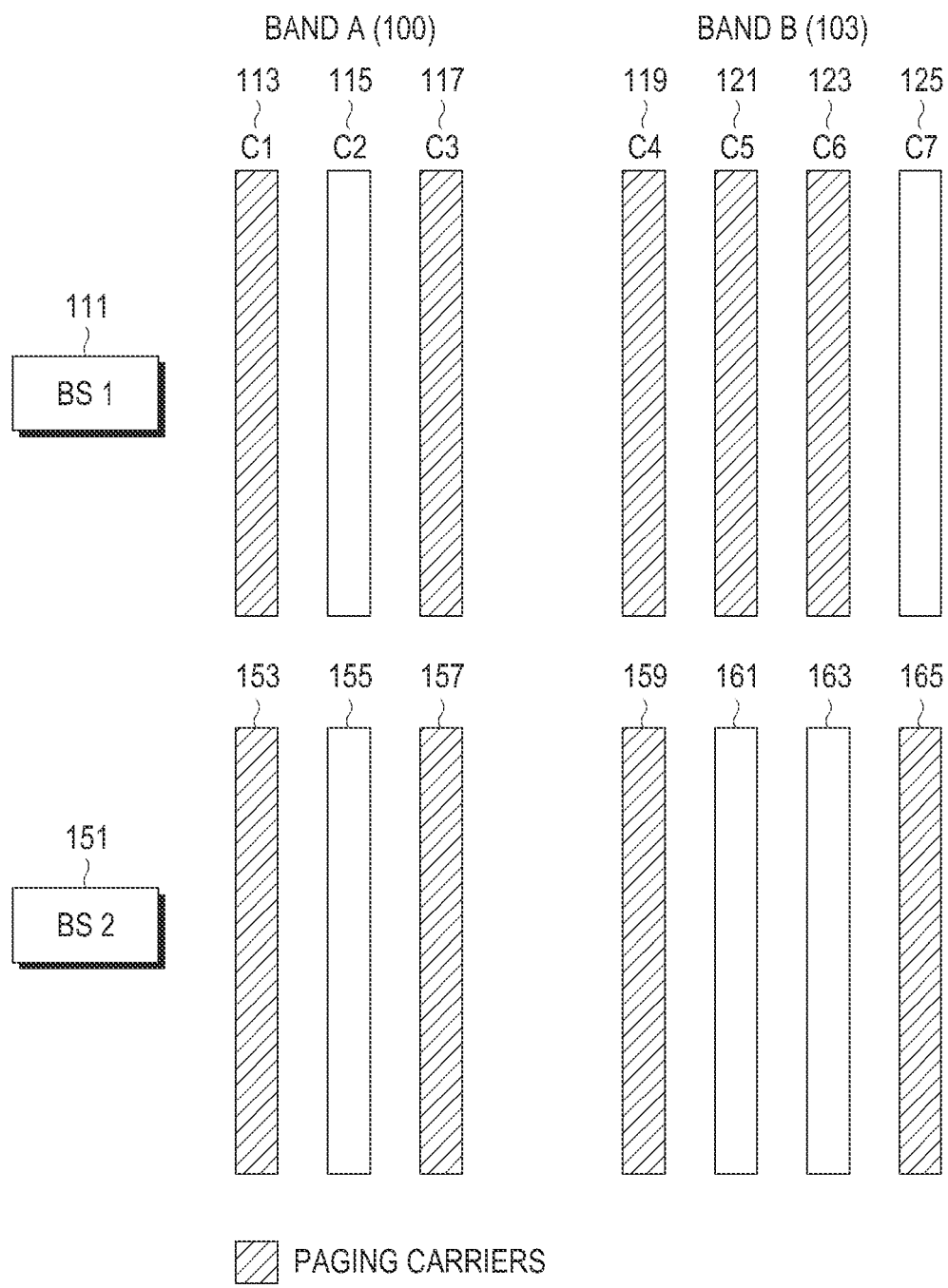
FIG. 1 is a diagram schematically illustrating an allocation structure of bands and carriers in a frequency overlay communication system according to an exemplary embodiment of the present invention.

The following description with reference to the accompanying drawings is provided to assist in a comprehensive understanding of exemplary embodiments of the invention as defined by the claims and their equivalents. It includes various specific details to assist that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Although a paging transmission/reception operation in a wireless communication system will be described herein with reference to the communication standard based on Institute of Electrical and Electronics Engineers (IEEE) 802.16e and 802.16m, it will be apparent to those skilled in the art that the paging operation proposed by exemplary embodiments of the present invention are not limited to specific communication protocols or system configurations and various changes in form and details may be made therein without departing from the spirit and scope of the invention as defined by the appended claims and their equivalents.

FIGS. 1 through 7, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

FIG. 1 is a diagram schematically illustrating an allocation structure of bands and carriers in a frequency overlay communication system according to an exemplary embodiment of the present invention.

Referring to FIG. 1, a frequency overlay communication system is operated in two frequency bands (hereinafter called 'bands' for simplicity): a band A 100 and a band B 103. For example, the band A 100 may have a center frequency of 2.5 GHz, and the band B 103 may have a center frequency of 3.5 GHz. The communication system has a Base Station (BS) 1 111 and a BS2 151, and the BS1 111 operates carriers C1 113, C2 115, and C3 117 in the band A 100 and carriers C4 119, C5 121, C6 123, and C7 125 in the band B 103, while the BS2 151 has carriers C1 153, C2 155, and C3 157 in the band A 100 and carriers C4 159, C5 161, C6 163, and C7 165 in the band B 103.

In order to reduce the burden that a Mobile Station (MS) in an idle mode should monitor all carriers to receive a paging message, each BS operates some predefined carriers as paging carriers. In the given example, the BS1 111 uses the carriers C1 113, C3 117, C4 119, C5 121, and C6 123 as paging carriers, while the BS2 151 uses the carriers C1 153, C3 157, C4 159, and C7 165 as paging carriers. Upon receiving a paging request from an upper-layer system, the BS1 111 or the BS2 151 transmits paging messages in paging carriers. These paging carriers have been introduced to prevent paging messages from being transmitted in all carriers of BSs in a duplicate way. A paging carrier an MS uses to receive a paging message may be selected from among the paging carriers based on a predefined specific operation.

Figure 2:
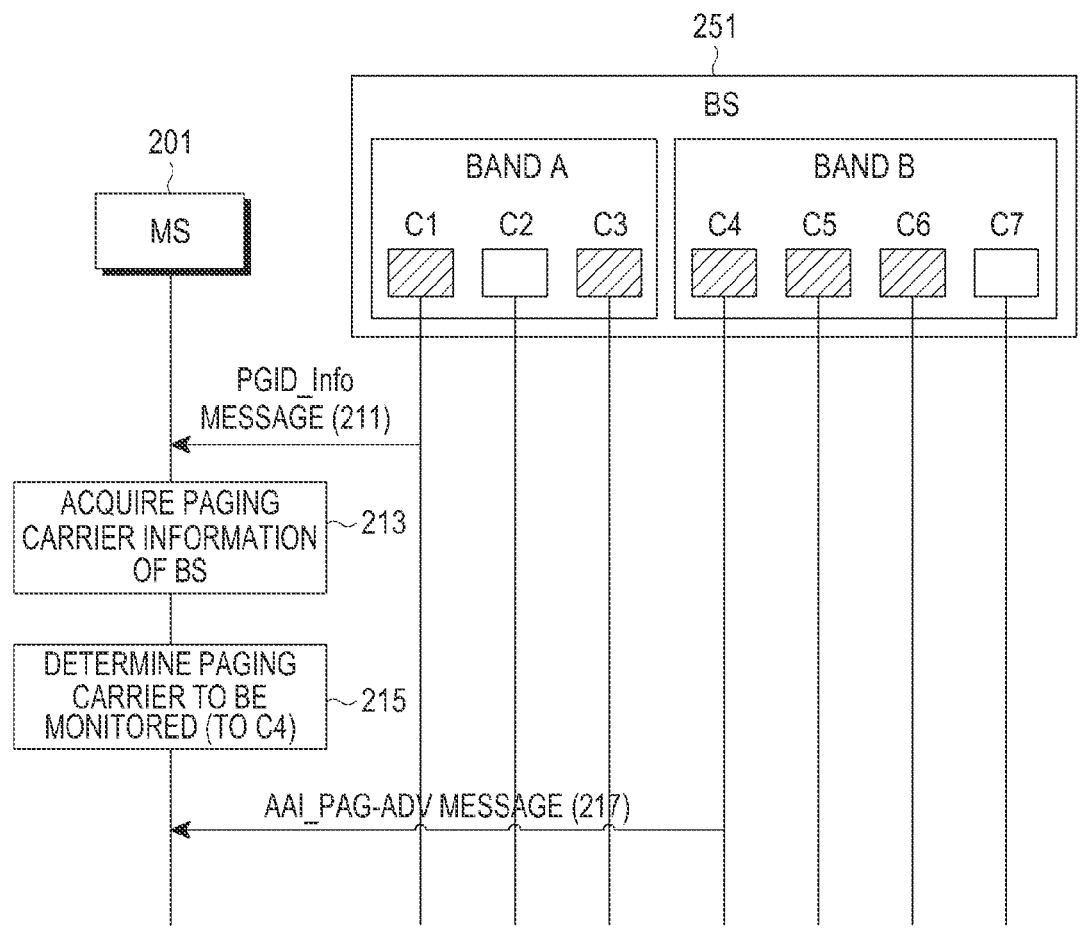
FIG. 2 is a message flow diagram illustrating an operation of selecting a paging carrier by a Mobile Station (MS) in a frequency overlay communication system according to an exemplary embodiment of the present invention.

FIG. 2 is a message flow diagram illustrating an operation of selecting a paging carrier by an MS in a frequency overlay communication system according to an exemplary embodiment of the present invention.

Referring to FIG. 2, an MS 201 is in an idle mode, and a BS 251 operates two bands: a band A and a band B, and the band A includes carriers C1, C2, and C3, and the band B includes carriers C4, C5, C6, and C7, and uses C1, C3, C4, C5, and C6 among them as paging carriers.

In step 211, the BS 251 transmits a paging control message for advertising a paging group supported by the BS 251, i.e., a Paging Group IDentification Information (PGID_Info) message, to MSs in the idle mode in a predefined location in a paging listening interval associated with a paging cycle. The PGID_Info message may be transmitted in all carriers configured for the BS 251, all paging carriers, or carriers indicated by the upper-layer system. The PGID_Info message includes information about at least one paging carrier operated by the BS, i.e., paging carrier information. For example, the PGID_Info message includes the number of Paging Group Identifiers (PGIDs) included in the PGID_Info message, a PGID of a paging group to which the BS transmitting the PGID_Info message belongs, and a paging carrier indication bitmap for indicating whether each carrier in the BS is a paging carrier. The paging carrier indication bitmap has the same size as the number of carriers operable in the BS, and bits in the bitmap are mapped to the operable carriers on a one-to-one basis. The number of paging carriers is equal to the number of bits which are set to '1' in the bitmap.

In step 213, the MS 201 in the idle mode acquires, from the PGID_Info message, paging carrier information of the BS 251, for identifying a paging carrier it will use to receive a Paging Advertisement (PAG-ADV) message. The paging carrier information includes, for example, a paging carrier indication bitmap for indicating at least one carrier to be used as a paging carrier among the carriers of the BS 251. In the given example, the paging carrier information indicates C1, C3, C4, C5, and C6 among the carriers C1~C7.

In step 215, the MS 201 determines a paging carrier it will monitor to receive a paging message for a paging listening interval, in accordance with a predefined operation equation. For example, the operation equation used to determine a paging carrier is as shown in Equation (1) below.

$$\text{Paging Carrier Index} = \text{DID} \bmod N \tag{1}$$

where Deregistration Identifier (DID) represents a deregistration identifier uniquely assigned to identify an MS in the idle mode, N represents the number of paging carriers operated by a BS, and 'mod' represents a modulo operation. A DID is assigned to an MS when the MS enters the idle mode, i.e., when the MS is deregistered, and N is acquired from the paging carrier information in the PGID_Info message.

For example, if a DID of the MS 201 is '237', a paging carrier for the MS 201 is determined as C4 because the number of paging carriers operated by the BS 251 is 5.

In step 217, the MS 201 receives a paging message for paging the MS 201, i.e., a PAG-ADV message, in the determined paging carrier C4. For example, the PAG-ADV message is transmitted along an IEEE 802.16m-based Advanced Air Interface (AAI). The PAG-ADV message includes Paged MS Info for indicating whether each of the MSs in the paging group has been paged. For example, the Paged MS Info includes a DID and an action code, and indicates by the action code whether the MS will perform network reentry or ranging for location update.

As described above, the MS 201 selects and monitors one of all the paging carriers operated by the BS 251 because the PAG-ADV message, unlike the PGID_Info message, is transmitted only in one carrier.

However, assuming that the BS 251 operates a band A and a band B having different band characteristics and the MS 201 supports only one (e.g., band A) of the band A and the band B instead of supporting both of them, even though C4 is selected by the operation equation, the MS 201 may not perform the transmission/reception operation in the C4. Therefore, the MS 201 may not receive a paging message for the MS 201 itself In this case, the MS 201 should inform the BS 251 and its upper-layer system, i.e., a paging control station, of the paging carrier preferred by the MS 201, which is determined by performing a location update procedure in the BS 251. Thereafter, a paging message for the MS 201 is transmitted in the preferred paging carrier.

If the band accessible by an MS is limited as described above, the overhead of performing the location update procedure may occur. Thus, paging overhead may not be uniformly distributed in the situation where a plurality of bands and a plurality of carriers exist, like in the allocation structure shown in FIG. 1.

To address these and other problems, a paging carrier may be determined based on band information for a band supported by an MS in exemplary embodiments of the present invention described below. Band information for an MS may be stored in and managed by a paging control station when the MS enters the idle mode. An Idle Mode (IM) Entry procedure may be performed in an MS-initiated or BS-initiated way.

Figure 3:
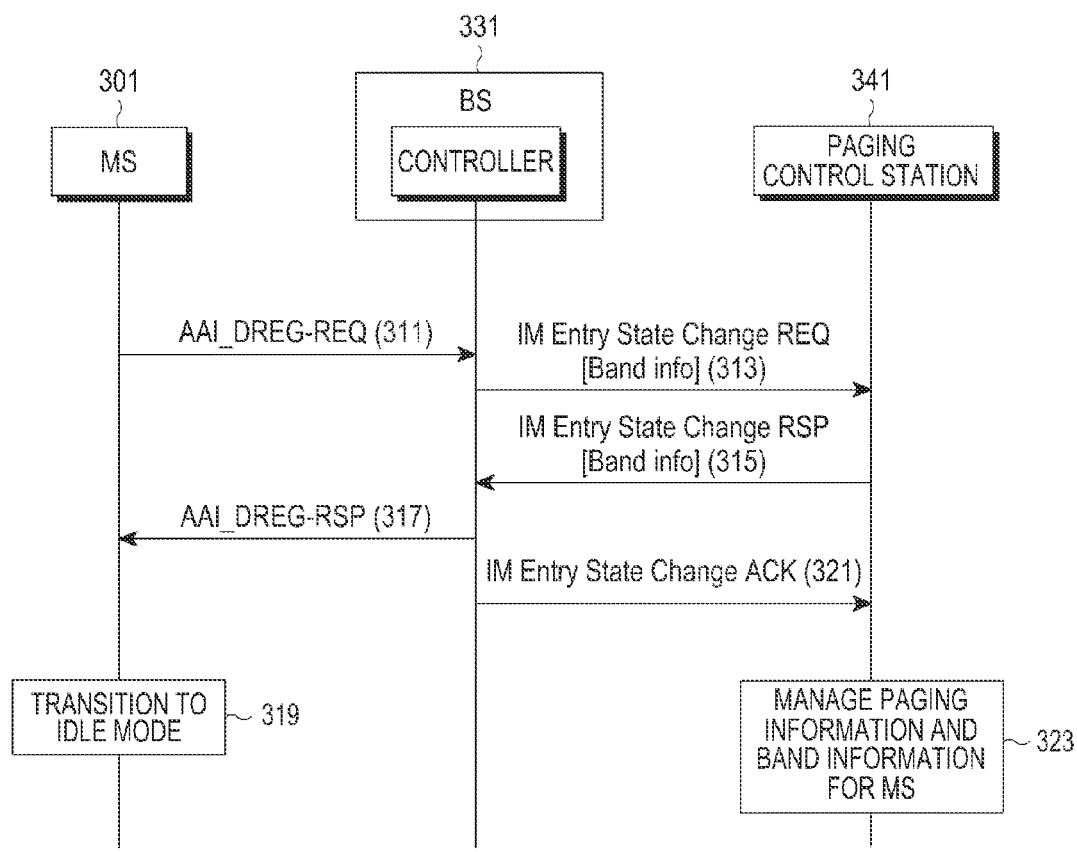
FIG. 3 is a message flow diagram illustrating an operation of transmitting band information for an MS in an Idle Mode (IM) Entry procedure according to an exemplary embodiment of the present invention.

FIG. 3 is a message flow diagram illustrating an operation of transmitting band information for an MS in an IM Entry procedure according to an exemplary embodiment of the present invention.

Referring to FIG. 3, an MS 301 supports a band A operated by a BS 331. In step 311, the MS 301 transmits to the BS 331 a Deregistration Request (DREG-REQ) message for IM Entry after completing data transmission/reception in C1 among the carriers of the BS 331. In step 313, the BS 331 transmits to a paging control station 341 a State Change REQ message for requesting IM Entry of the MS 301. The State Change REQ message includes information about a band supported by the MS 301. In the given example, the band information indicates the band A in which the MS 301 performs IM Entry. In the alternative, the State Change REQ message may include information about all bands supported by the MS 301. For example, if the MS 301 supports a band C in addition to the band A, information about the band A and the band C may be included in the State Change REQ message.

In step 315, the paging base station 341 transmits a State Change Response (RSP) message to the BS 331 in response to the State Change REQ message. The State Change RSP message may include the band information for the MS 301, which was delivered in the State Change REQ message.

In step 317, the BS 331 transmits to the MS 301 a Deregistration Response (DREG-RSP) message for notifying the completion of the IM entry procedure. In step 319, the MS 301 transitions to the idle mode in reply to the DREG-RSP message. Thereafter, in step 321, the BS 331 transmits a State Change Acknowledgement (ACK) message to the paging control station 341. In step 323, the paging control station 341 manages paging information and band information for the MS 301. The paging information may include, for example, a paging cycle, a paging offset, a DID, a paging group, context information, and the like. The band information is stored in the paging control station 341 to be used for paging the MS 301.

While the MS-initiated IM Entry procedure has been described so far with reference to FIG. 3, a BS-initiated IM Entry procedure may also be performed in a similar way. In the BS-initiated IM Entry procedure, band information is exchanged between a BS and a paging control station. In other words, the BS exchanges band information for indicating a band supported by an MS with the paging control station before transmitting to the MS a DREG-RSP message for IM entry.

Figure 4:
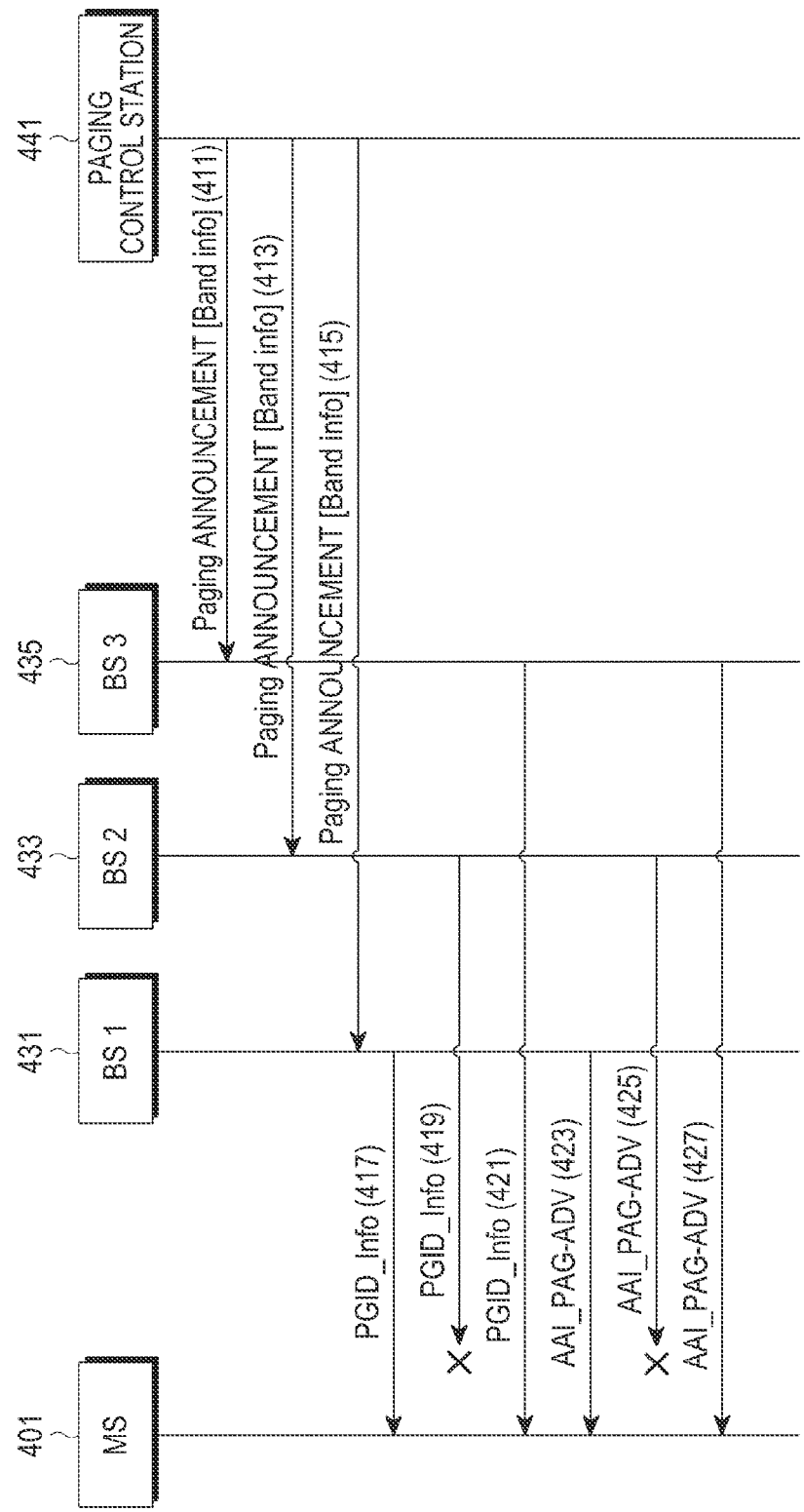
FIG. 4 is a message flow diagram illustrating an operation of transmitting a Paging announcement message for an MS in a paging listening interval according to an exemplary embodiment of the present invention.

FIG. 4 is a message flow diagram illustrating an operation of transmitting a Paging announcement message for an MS in a paging listening interval according to an exemplary embodiment of the present invention.

Referring to FIG. 4, an MS 401 supports a band A operated by a BS1 431 and a BS3 435, and a BS2 433 operates a band other than the band A. In steps 411, 413 and 415, a paging control station 441 transmits a Paging announcement message instructing to transmit a PAG-ADV message to the MS 401 in an idle mode, to the BS1 431, the BS2 433 and the BS3 435 managed by the paging control station 441. The Paging announcement message includes band information for a band in which the PAG-ADV message is transmitted. The band information included in the Paging announcement message is the same as the band information that the paging control station 441 manages for the MS 401. For example, the band information may be stored in the paging control station 441 by the procedure shown in FIG. 3.

Upon receiving a paging request for the MS 401, the paging control station 441 searches for band information stored for the MS 401, generates the Paging announcement message including the found band information, and transmits the generated Paging announcement message to BSs in a paging group managed by the paging control station 441 itself If there is no band information stored for the MS 401, the paging control station 441 may acquire the band information by requesting another paging control station storing band information for the MS 401 to provide the band information.

Each of the BS1 431, the BS2 433 and the BS3 435 generates a PGID_Info message and a PAG-ADV message depending on the information about the MS 401, indicated by the Paging announcement message, and the information about the band supported by the MS 401. In other words, each of the BSs 431, 433, and 435 selects the band supported by the MS 401 from among at least one band operated by the BS itself, and selects a carrier to be used as a paging carrier from among carriers in the selected band. In steps 417, 419, and 421, PGID_Info messages including paging group information of the BSs 431, 433 and 435 and band-specific paging carrier information are transmitted from the BSs 431, 433 and 435 to the MS 401, respectively. For example, the band-specific paging carrier information may include the number of bands operated by a BS, the number of carriers in each band operated by the BS, and a bitmap Bitmap_Band for indicating a paging carrier among the carriers in each band. Therefore, there are as many bitmaps as the number of bands operated. A size or length of a specific bitmap is equal to the number of carriers in the associated band, and a bit, which is set to '1', represents a paging carrier among the carriers in the associated band.

The MS 401 may receive the PGID_Info message transmitted from the BS1 431 or the BS3 435 because it supports the band operated by the BS1 431 and the BS3 435. In the alternative, the BS2 433 may decide not to transmit a PGID_Info message and a PAG-ADV message, recognizing from the band information that the MS 401 does not support the band operated by the BS2 433 itself.

After transmitting the PGID_Info messages, the BS1 431, the BS2 433 and the BS3 435 transmit their own PAG-ADV messages in the selected paging carriers in steps 423, 425, and 427. The PAG-ADV message includes only the information about the MS 401, determined to receive the PAG-ADV message in the selected associated paging carrier. The MS 401 may receive the PAG-ADV message in the paging carrier selected by the BS1 431 or the BS3 435 because it supports the band operated by the BS1 431 and the BS3 435.

Figure 5:
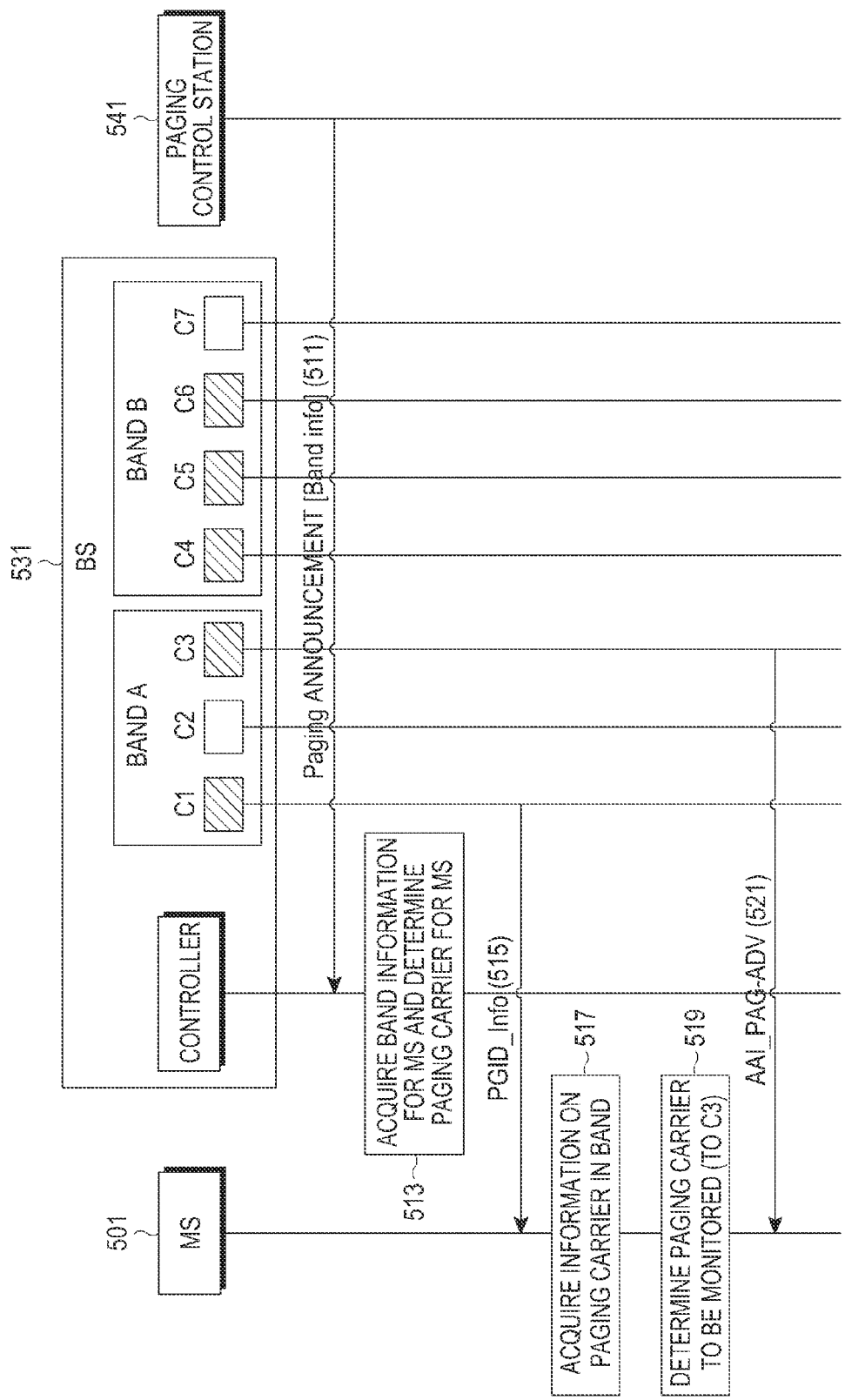
FIG. 5 is a message flow diagram illustrating an operation of selecting a paging carrier and receiving a paging message by an MS in a paging listening interval according to an exemplary embodiment of the present invention.

FIG. 5 is a message flow diagram illustrating an operation of selecting a paging carrier and receiving a paging message by an MS in a paging listening interval according to an exemplary embodiment of the present invention.

Referring to FIG. 5, a BS 531 operates two bands: a band A and a band B, and the band A includes carriers C1, C2, and C3 and the band B includes carriers C4, C5, C6, and C7. The carriers C1 and C3 in the band A are used as paging carriers of the band A, and the carriers C4, C5, and C6 in the band B are used as paging carriers of the band B.

In step 511, a paging control station 541 transmits a Paging announcement message instructing the BS 531 to transmit a PAG-ADV message to an MS 501. As described above, the Paging announcement message includes a band index for indicating the band (e.g., band A) supported by the MS 501.

In step 513, the BS 531 determines a paging carrier for the MS 501 in accordance with a predefined operation equation, recognizing from the Paging announcement message that the MS 501 supports the band A. For example, the operation equation used to determine a paging carrier is as shown in Equation (2) below.

$$\text{Paging Carrier Index} = \text{DID} \bmod \text{N\_Band} \qquad (2)$$

where DID represents an identifier uniquely assigned to identify an MS in the idle mode, and N_Band represents the number of paging carriers in an associated band. The MS 501 may recognize N_Band from band-specific paging carrier information of the band supported by the MS 501. For example, if a DID of the MS 501 is '237', a paging carrier for the MS 501 is determined as C3 because the number of paging carriers in the band A supported by the MS 501 is 2.

In step 515, the BS 531 transmits a PGID_Info message to the MS 501. The PGID_Info message includes paging group information of the BS 531 and band-specific paging carrier information. For example, the band-specific paging carrier information includes a bitmap '101' for the band A and a bitmap '1110' for the band B. The MS 501 may receive the PGID_Info message in an arbitrary carrier, i.e., C1.

In step 517, the MS 501 acquires information about the paging carriers C1 and C3 operated by the BS 531 in the band A supported by the MS 501, from the band-specific paging carrier information in the PGID_Info message. In step 519, the MS 501 determines the paging carrier C3 used to receive a paging message, using the same operation equation as that used in the BS 531, for example, Equation (2), and monitors the determined paging carrier C3. In step 521, the MS 501 receives a PAG-ADV message transmitted by the BS 531 in the paging carrier C3.

Figure 6A:
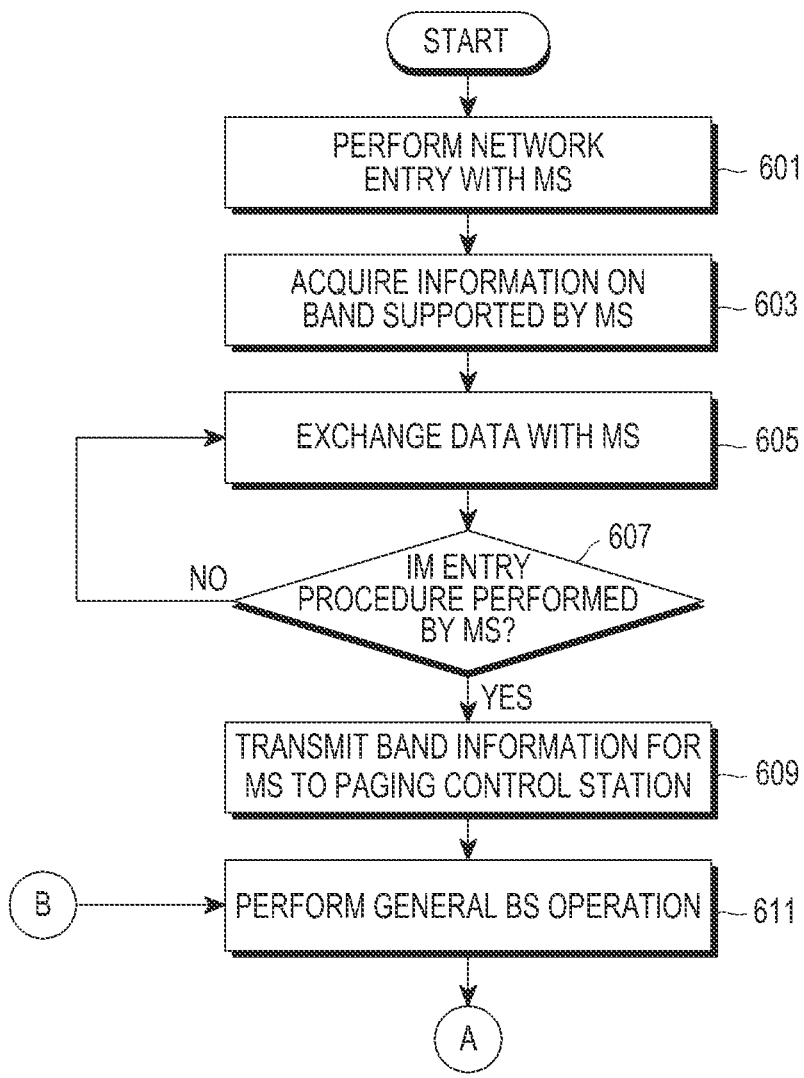
FIGS. 6A and 6B are flowcharts illustrating an operation of transmitting a paging message using band information for an MS by a Base Station (BS) according to an exemplary embodiment of the present invention.
Figure 6B:
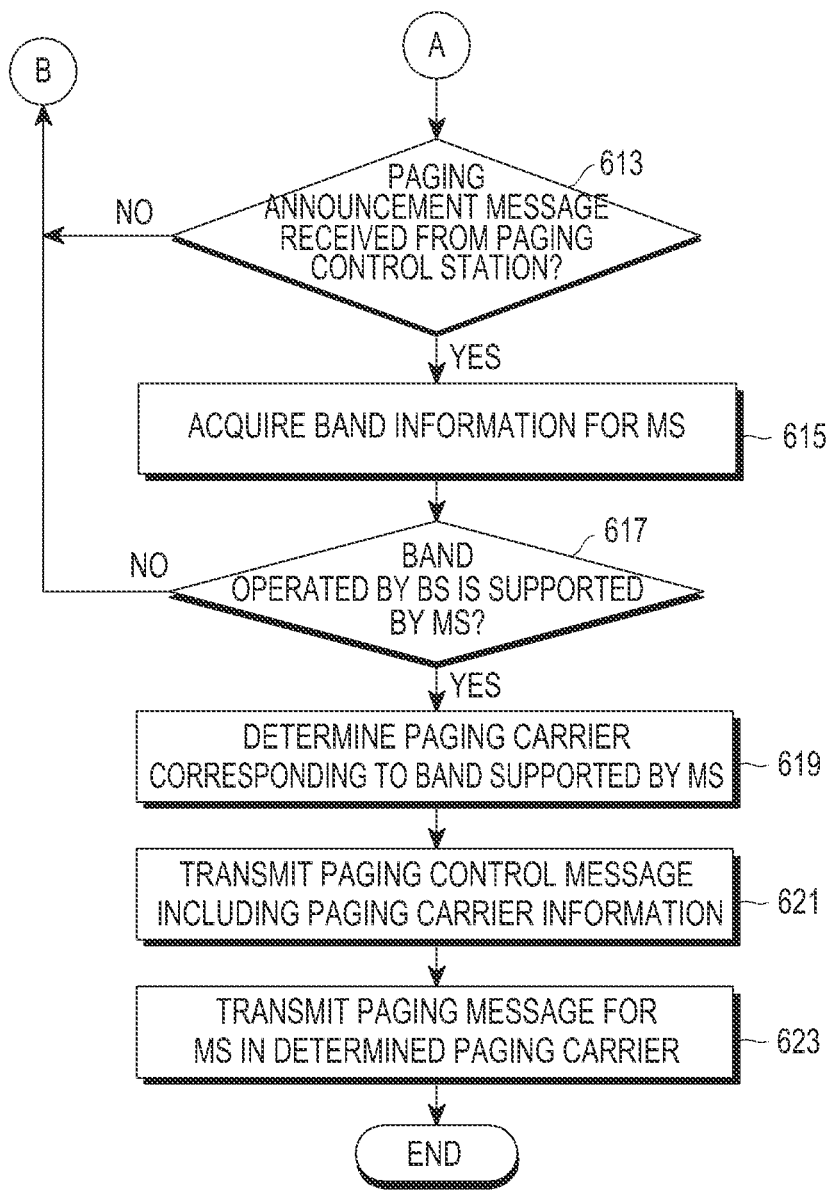

FIGS. 6A and 6B are flowcharts illustrating an operation of transmitting a paging message using band information for an MS by a BS according to an exemplary embodiment of the present invention.

Referring to FIGS. 6A and 6B, a BS performs a network entry procedure with an MS in step 601, and acquires band information for a band supported by the MS in step 603. While performing data exchange with the MS in step 605, the BS determines in step 607 whether the MS performs an IM Entry procedure for transitioning to the idle mode. The IM Entry procedure includes a process in which the MS and the BS exchange a DREG-REQ message and a DREG-RSP message. If it is determined in step 607 that the MS performs the IM Entry procedure, the BS transmits paging information and band information for the MS to a paging control station in step 609. The paging information and band information are delivered in State Change REQ/RSP/ACK messages exchanged between the BS and the paging control station. After the MS is deregistered, the BS may perform a general BS operation in step 611, such as performing data exchange with another MS in an active mode.

While performing the general BS operation, the BS determines in step 613 whether a Paging announcement message is received from the paging control station. The Paging announcement message includes paging information and band information for an MS to which the BS will transmit a paging message. The MS to which the paging message is to be transmitted may be an MS, which is the same as or different from the MS that performed the IM Entry procedure in step 607.

If it is determined in step 613 that the Paging announcement message has been received, the BS acquires the band information for the MS from the Paging announcement message in step 615. Therefore, the BS may receive the band information for the MS from the paging control station even though the paging-instructed MS does not perform the IM Entry procedure in the BS. In step 617, the BS determines if the MS supports the band operated by the BS. If it is determined in step 617 that the MS supports the band operated by the BS, the BS determines at least one paging carrier to be used, in the band, and determines a paging carrier that the MS will monitor to receive a paging message, using a predefined operation equation in step 619. In step 621, the BS transmits band-specific paging carrier information for indicating the at least one paging carrier determined for the band to the MS using a paging control message. In step 623, the BS transmits a paging message for the MS in the paging carrier determined for the MS.

The above-described operations according to exemplary embodiments of the present invention may be realized by mounting a memory device storing associated program codes in each of a BS and an MS. In other words, each of the BS and the MS reads and runs the program codes stored in the memory device by means of a controller including a processor or a Central Processing Unit (CPU), and exchanges necessary information with the other party through a transceiver, thereby performing the foregoing operations.

Specifically, a BS includes a controller (e.g., including a processor or a CPU) for generating a paging control message and a paging message and analyzing a Paging announcement message, and at least one band transceiver for transmitting the paging control message and the paging message under control of the controller. Similarly, an MS includes a controller (e.g., including a processor or a CPU) for analyzing a paging control message and a paging message and for determining whether the MS is paged, and at least one band transceiver for receiving the paging control message and the paging message under control of the controller.

Figure 7:
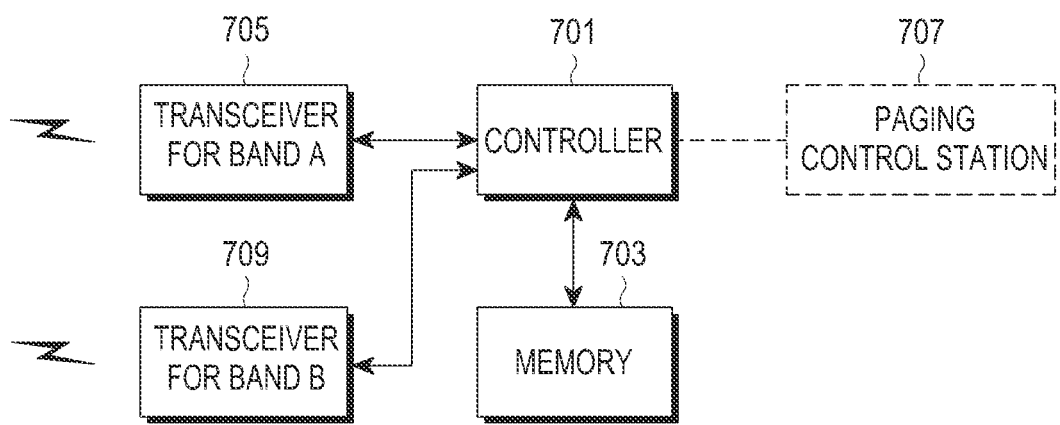
FIG. 7 is a block diagram schematically illustrating a structure of a BS according to an exemplary embodiment of the present invention.

FIG. 7 is a block diagram schematically illustrating a structure of a BS according to an exemplary embodiment of the present invention.

Referring to FIG. 7, a controller 701 receives a Paging announcement message from a paging control station 707 or an upper-layer system, acquires MS information and band information included in the Paging announcement message, and stores the acquired information in a memory 703. The controller 701 generates a paging control message and a paging message for an MS depending on the MS information and the band information. The controller 701 determines a paging carrier for transmitting a paging message for the MS in a band supported by the MS, based on the band information. The paging control message is transmitted through band transceivers of the BS, for example, a band-A transceiver 705 and a band-B transceiver 709. The paging message is transmitted in the paging carrier for the MS, selected by the controller 701, after the paging control message is transmitted.

As is apparent from the foregoing description, exemplary embodiments of the present invention may prevent the overhead caused by using the band class unsupported by an MS, and may efficiently distribute the inter-carrier paging load in a BS. In addition, the exemplary embodiments of the present invention may reduce the paging message overhead caused by managing paging carriers and may ensure reception of a paging message in a band supported by an MS, thereby preventing the unnecessary location update procedure.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting a paging message by a Base Station (BS) in a wireless communication system, the method comprising:

transmitting, to a Mobile Station (MS) in an idle mode, a paging information message over all carriers in a primary frequency band and a secondary frequency band, the paging information message including information on a paging group identifier to which the BS belongs, and information regarding paging carriers in the primary frequency band and the secondary frequency band;

determining a paging carrier for transmitting a paging message among the paging carriers; and transmitting, to the MS, the paging message using the determined paging carrier.

2. The method of claim 1, wherein the paging information message includes information for indicating a number of paging group identifiers included in the paging information message.

3. The method of claim 1, wherein the determining of the paging carrier comprises determining the paging carrier by performing a modulo operation on an identifier of the MS by a number of the paging carriers.

4. The method of claim 1, wherein the paging carrier is located on a same frequency band that the paging information message is sent over.

5. The method of claim 1, wherein the information regarding paging carriers includes a paging carrier indication bitmap for indicating whether corresponding carriers are the paging carriers in the BS or not, and the paging carrier indication bitmap includes a paging carrier indication bit for indicating whether a corresponding carrier is used for transmitting the paging message.

6. The method of claim 5, wherein when the paging carrier indication bit is 1, then the corresponding carrier is used for transmitting the paging message, and when the paging carrier indication bit is 0, then the corresponding carrier is not used for transmitting the paging message.

7. A method for receiving a paging message by a Mobile Station (MS) in a wireless communication system, the method comprising:

receiving in an idle mode, from a Base Station (BS), a paging information message over all carriers in a primary frequency band and a secondary frequency band, the paging information message including information on a paging group identifier to which the BS belongs, and information regarding paging carriers in a primary frequency band and a secondary frequency band operated by the BS;

determining a paging carrier for receiving a paging message among the paging carriers; and receiving, from the BS, the paging message using the determined paging carrier.

8. The method of claim 7, wherein the paging information message includes information for indicating a number of paging group identifiers included in the paging information message.

9. The method of claim 7, wherein the determining of the paging carrier comprises determining the paging carrier by performing a modulo operation on an identifier of the MS by a number of the paging carriers.

10. The method of claim 7, wherein the paging carrier is located on a same frequency band that the paging information message is sent over.

11. The method of claim 7, wherein the information regarding paging carriers includes a paging carrier indication bitmap for indicating whether corresponding carriers are the paging carriers in the BS or not, and the paging carrier indication bitmap includes a paging carrier indication bit for indicating whether a corresponding carrier is used for transmitting the paging message.

12. The method of claim 11, wherein when the paging carrier indication bit is 1, then the corresponding carrier is used for transmitting the paging message, and when the paging carrier indication bit is 0, then the corresponding carrier is not used for transmitting the paging message.

13. A Base Station (BS) for transmitting a paging message in a wireless communication system, the BS comprising:

a transceiver for transmitting, to a Mobile Station (MS) in an idle mode, a paging information message over all carriers in a primary frequency band and a secondary frequency band, the paging information message including information on a paging group identifier to which the BS belongs, and information regarding paging carriers in the primary frequency band and the secondary frequency band; and a controller for determining a paging carrier for transmitting a paging message among the paging carriers, and controlling the transceiver for transmitting, to the MS, the paging message using the determined paging carrier.

14. The BS of claim 13, wherein the paging information message includes information for indicating a number of paging group identifiers included in the paging information message.

15. The BS of claim 13, wherein the controller determines the paging carrier by performing a modulo operation on an identifier of the MS by a number of the paging carriers.

16. The BS of claim 13, wherein the paging carrier is located on a same frequency band that the paging information message is sent over.

17. The BS of claim 13, wherein the information regarding paging carriers includes a paging carrier indication bitmap for indicating whether corresponding carriers are the paging carriers in the BS or not, and the paging carrier indication bitmap includes a paging carrier indication bit for indicating whether a corresponding carrier is used for transmitting the paging message.

18. The BS of claim 17, wherein when the paging carrier indication bit is 1, then the corresponding carrier is used for transmitting the paging message, and when the paging carrier indication bit is 0, then the corresponding carrier is not used for transmitting the paging message.

19. A Mobile Station (MS) for receiving a paging message in a wireless communication system, the MS comprising:

a transceiver for receiving in an idle mode, from a Base Station (BS), a paging information message over all carriers in a primary frequency band and a secondary frequency band, the paging information message including information on a paging group identifier to which the BS belongs, and information regarding paging carriers in the primary frequency band and the secondary frequency band; and a controller for determining a paging carrier for receiving a paging message among the paging carriers, and controlling the transceiver for receiving, from the BS, the paging message using the determined paging carrier.

20. The MS of claim 19, wherein the paging information message includes information for indicating a number of paging group identifiers included in the paging information message.

21. The MS of claim 19, wherein the controller determines the paging carrier by performing a modulo operation on an identifier of the MS by a number of the paging carriers.

22. The MS of claim 19, wherein the paging carrier is located on a same frequency band that the paging information message is sent over.

23. The MS of claim 19, wherein the information regarding paging carriers includes a paging carrier indication bitmap for indicating whether corresponding carriers are the paging carriers in the BS or not, and the paging carrier indication bitmap includes a paging carrier indication bit for indicating whether a corresponding carrier is used for transmitting the paging message.

24. The MS of claim 23, wherein when the paging carrier indication bit is 1, then the corresponding carrier is used for transmitting the paging message, and when the paging carrier indication bit is 0, then the corresponding carrier is not used for transmitting the paging message.

* * * * *